(12) United States Patent
Henderson et al.

(10) Patent No.: US 6,378,042 B1
(45) Date of Patent: Apr. 23, 2002

(54) CACHING ASSOCIATIVE MEMORY

(75) Inventors: Alex E. Henderson, Hillsborough; Walter E. Croft, San Mateo, both of CA (US)

(73) Assignee: Fast-Chip, Inc., Sunnyvale, CA (US)

( * ) Notice: Subject to any disclaimer, the term of this patent is extended or adjusted under 35 U.S.C. 154(b) by 0 days.

(21) Appl. No.: 09/636,305

(22) Filed: Aug. 10, 2000

Related U.S. Application Data

(60) Provisional application No. 60/148,406, filed on Aug. 11, 1999.

(51) Int. Cl.[7] .............................................. G06F 12/12
(52) U.S. Cl. ..................... 711/128; 711/137; 711/122; 711/134; 711/159
(58) Field of Search ............................. 711/128, 133, 711/134, 136, 154, 159, 160, 108, 119, 122, 137

(56) References Cited

U.S. PATENT DOCUMENTS

| 3,911,401 A | | 10/1975 | Lee ............................. 711/123 |
| 4,980,823 A | * | 12/1990 | Liu ............................. 711/136 |
| 5,265,232 A | * | 11/1993 | Gannon et al. ............. 711/124 |
| 5,701,426 A | * | 12/1997 | Ryan ............................. 711/3 |
| 5,761,706 A | * | 6/1998 | Kessler et al. ............. 711/118 |
| 5,822,757 A | * | 10/1998 | Chi ............................. 711/129 |
| 5,970,509 A | * | 10/1999 | Green ......................... 711/128 |
| 5,996,071 A | * | 11/1999 | White et al. ................ 712/238 |
| 6,065,091 A | * | 5/2000 | Green ........................... 711/3 |
| 6,161,144 A | * | 12/2000 | Michels et al. ............. 709/238 |
| 6,195,735 B1 | * | 2/2001 | Krueger et al. ............. 711/204 |
| 6,292,871 B1 | * | 9/2001 | Fuente ........................ 711/136 |

FOREIGN PATENT DOCUMENTS

WO   WO 99/26139   5/1999

OTHER PUBLICATIONS

"Cache Data Update to MRU", IBM Technical Disclosure Bulletin, vol. 29, No. 10. Mar. 1987, p. 4282.
"The Nth Chance Algorithm for Virtual Memory", IBM Technical Disclosure Bulletin, vol. 29, No. 9, Feb. 1987, pp. 4187–4188.

* cited by examiner

Primary Examiner—Matthew Kim
Assistant Examiner—B. R. Peugh
(74) Attorney, Agent, or Firm—Fenwick & West LLP

(57) ABSTRACT

A system and method for operating an associative memory cache device in a computer system. The system comprises a search client configured to search for data in a caching associative memory such as a content addressable memory (CAM); a caching associative memory element coupled to the search client for generating a matching signal; and a associative memory element coupled to the caching associative element configured to search for data not stored in the caching associative memory element. The search client issues a search request for data to associative cache element. If the matching data is found there, then such matching data is returned to the search client. Alternatively, if the data is not found, then the search request is issued to the main associative memory. The least frequently used data or the least recently used data in the associative memory cache are replaced with the matching data and the higher priority data.

22 Claims, 16 Drawing Sheets

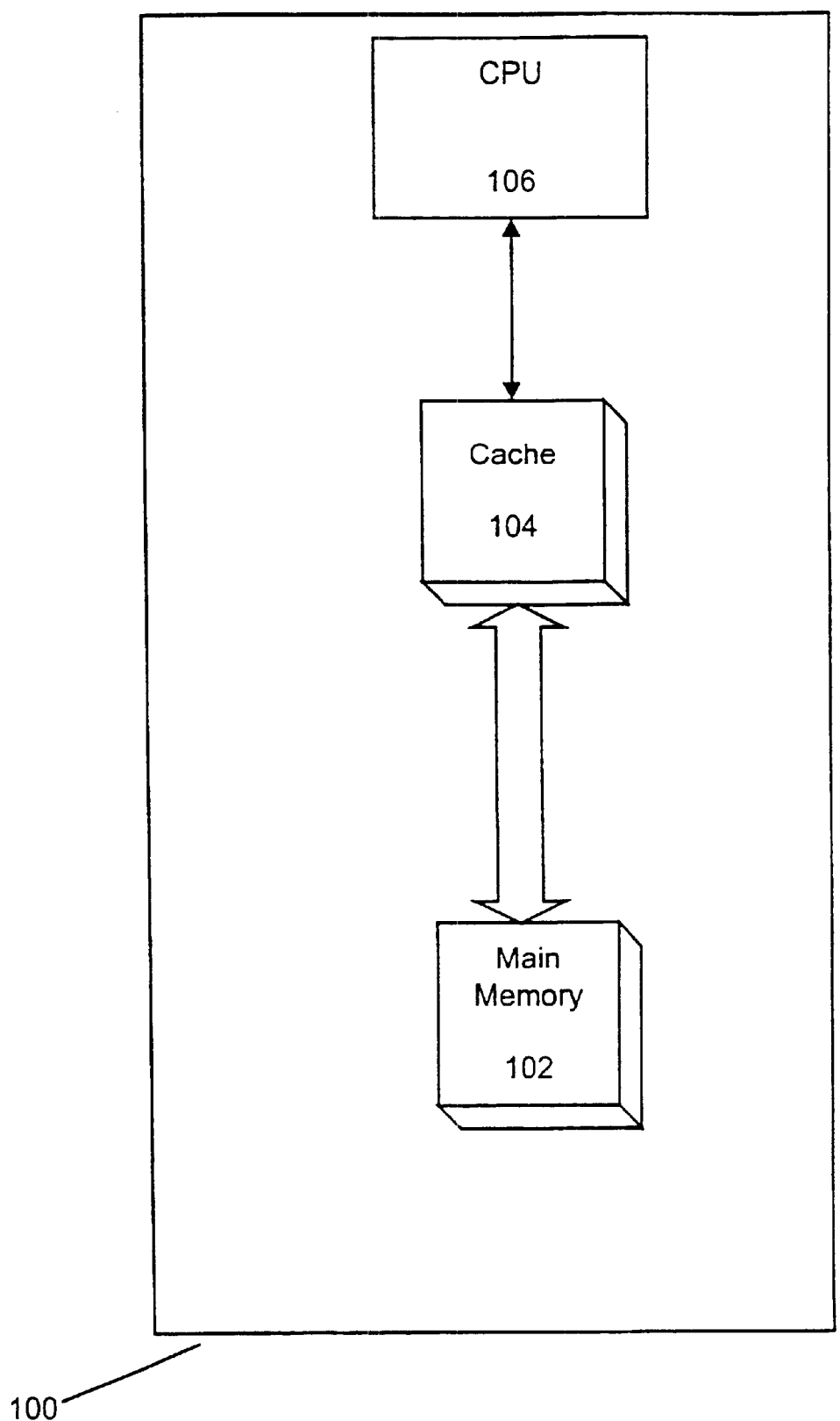
Fig. 1  *Prior Art*

CACHING ASSOCIATIVE MEMORY

RELATED APPLICATION

The subject matter of the present application is related to and claims priority, under 35 U.S.C. §119(e), from U.S. Provisional patent application Ser. No. 60/148,406 entitled "External Content Addressable Memory (CAM) With Cache CAM" by Alex E. Henderson and Walter E. Croft, which application was filed on Aug. 11, 1999 and is incorporated herein by reference.

BACKGROUND

A. Technical Field

The present invention relates generally to associative memories, and in particular to cache organizations for associative memories.

B. Background of the Invention

An associative memory semiconductor device is a device such as a content addressable memory (CAM. CAM is a well-known device that permits the contents of the memory to be searched and matched instead of having to specify a memory location address in order to retrieve data from the memory. Associative memory can be used to accelerate any application requiring fast searching of a database, list, or pattern, such as in database machines, image or voice recognition, or computer and communication networks. Associative memory provides a performance advantage over conventional memory devices with conventional memory search algorithms, such as binary or tree-based searches, by comparing the desired information against the entire list of entries simultaneously, giving an order-of-magnitude reduction in search time associative memory devices are often used to store a routing table for high speed switching systems. These systems need to rapidly search the routing table to look for a matching destination address so that a data packet may be routed to the appropriate destination address.

Future generations of communications switches require multi-level switching (routing) policy tables with hundreds of thousands of entries and speeds achievable only with associative memory. However, such routing policy tables may need only a few thousand data base entries at any given time instead of more than half a million of data base entries. Next generation products will probably require associative memory in the 4 to 128 Mbit range. Associative memories this size, however, require hundreds of millions of transistors, far too many to incorporate in a single chip in the next several generations of semiconductor processes. Therefore, caching associative memories will be required for future generations of communications Integrated Circuits.

Conventional cache memory systems are well known in the art. A typical cache memory subsystem consists of Tag Random Access Memory and Data RAM. Both TagRAM and DataRAM are in the form of a high-speed static random access memory (SRAM), which provides faster access time than the dynamic random access memory (DRAM). Conventional well-known random access memory device CAM) is an integrated circuit that temporarily stores data in an array of memory cells. In the RAM device, each stored piece of data may be accessed independently of any other piece of data. The data in a RAM is stored at a particular location called an address. Accordingly, indicating the address at which the data is located may access any piece of data in the RAM.

Conventional algorithms are known for determining which data needs to be replaced in a conventional RAM cache system. Two of the most widely used algorithms are Least Recently Used (LRU), or Least Frequently Used (LFU). In the RAM caching system only one match can be found in a given time. Since only one entry can be replaced at a time, these algorithms can be easily implemented in the RAM caching system. A search on an associative memory, however, may result in several matches in response to the search input. Consequently, the existing algorithms need to be substantially modified in order to deal with multiple matches.

Accordingly, it is desirable to provide a caching associative memory device that in combination with a conventional external associative memory or algorithmic search engine is capable of searching a big volume of data, thereby overcoming the problems of conventional associative memory devices. Furthermore, it is desirable to provide a system that is capable of determining which entries need to be replaced in such a caching associative memory device when no matching data is found.

SUMMARY OF THE INVENTION

The present invention is a system and a method for operating an associative memory cache device in a computer system. The system comprises a search client configured to search for data in an associative memory cache, an associative memory cache element coupled to the search client for generating a matching signal, and a main associative memory element coupled to the associative memory cache element configured to search for data not found in the associative memory cache element.

In one aspect, the present invention is a multi-level system for operating an associative memory cache device, comprising a search client configured to search for data in an associative memory, a multi-level associative memory cache coupled to the search client in a multilevel hierarchy for searching for data, and an associative memory element coupled to the multi-level associative memory cache for generating a matching signal.

In another aspect, the present invention is a method for operating an associative memory cache device. The method comprises receiving a search request for data, returning a matching signal and overlapping higher priority signals responsive to finding the data in the associative memory cache.

In yet another aspect, the present invention is a method for operating an associative memory cache device. The method comprises receiving a search request for data to the associative memory cache element, issuing the search request for the data to the associative memory element responsive to not finding the data in the associative memory cache element, determining which data needs to be replaced in the associative memory cache element, and replacing the data in the associative memory cache element with new data.

In another aspect, the present invention is a method for operating a multilevel associative memory cache device. The method comprises searching a first level associative memory element; providing a search result if matching data is found in the level 1 associative memory cache element; searching a second level associative memory or other associative memory cache element if a match was not found; providing a search result if matching data is found in the level 2 associative memory cache element; searching a higher level associative memory cache elements and a top level associative memory until a match is found; providing a search result from the higher level associative memory cache elements and the top level associative memory; and replacing entries in the multiple cache levels based on either a LRU of LFU algorithm.

These and other features and advantages of the present invention may be better understood by considering the following detailed description of preferred embodiments of the invention. In the course of this description, reference will be frequently made to the attached drawings.

BRIEF DESCRIPTION OF THE DRAWINGS

FIG. 1 is a block diagram of a conventional prior art cache memory system.

DETAILED DESCRIPTION OF THE PREFERRED EMBODIMENT

FIG. 1 illustrates a conventional cache system 100. The cache system 100 comprises a central processing unit (CPU) 106 having a conventional random access memory JAM) 102 associated therewith, and a conventional cache memory 104 which can be a static random access memory (SRAM), or a dynamic random access memory (DRAM). The CPU 106 is preferably a conventional microprocessor, such as a Pentium II (Intel Corporation, Santa Clara, Calif.) or generally equivalent processor. When the CPU 106 sends out an address of main memory 102 it would like to access, a comparison is made between the external CPU address and the data stored in the cache memory 104 to determine if the desired data is present in cache memory 104. If the data is present, i.e., if there is a HIT, the data is accessed from the cache 104. Otherwise, the data is accessed from the main memory 102. When the data is not found in the cache 104, i.e., if there is a MISS, only one entry needs to be replaced in the cache 104 at a given time.

Figure 2A:
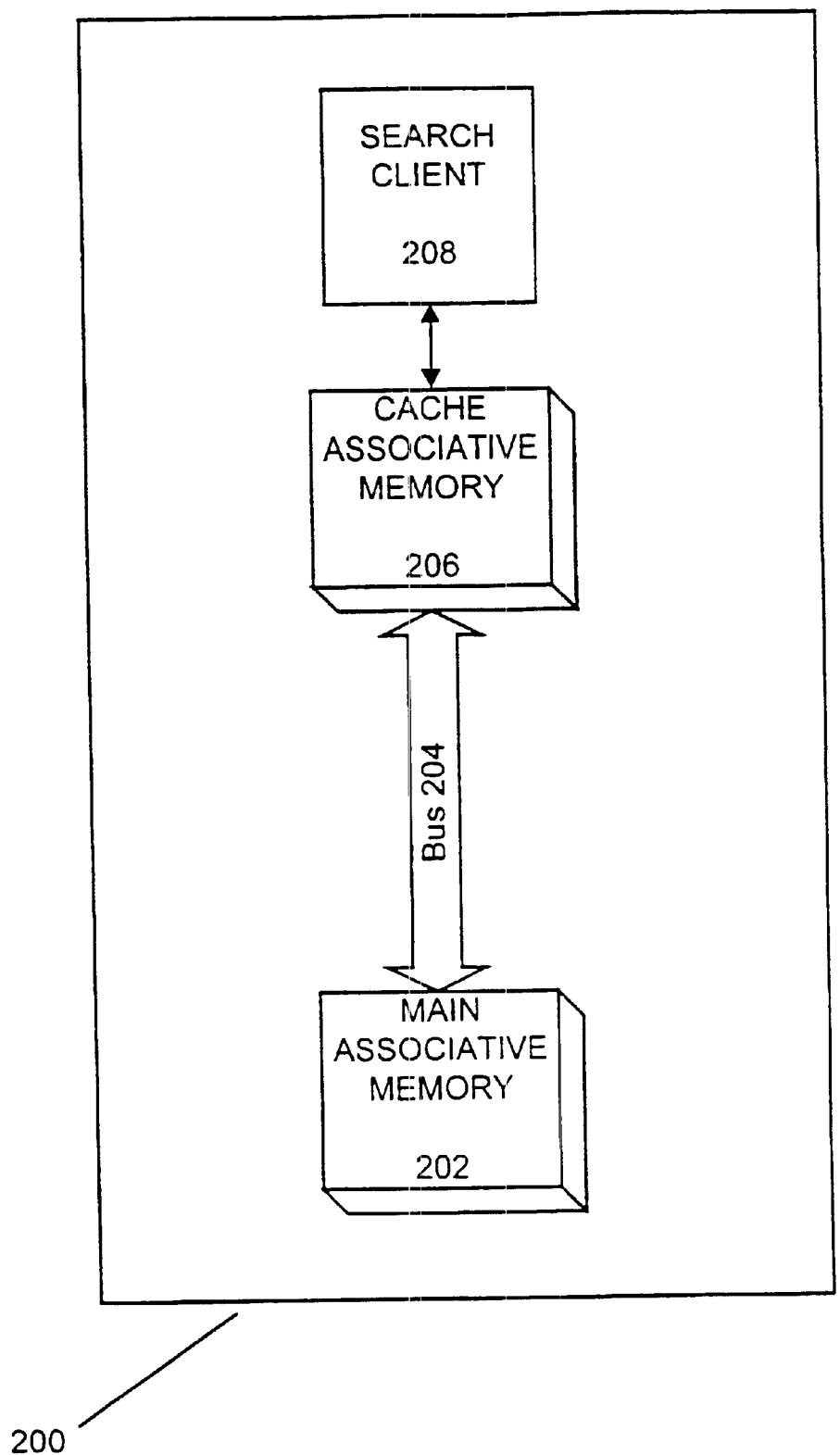
FIG. 2A is a high level block diagram of one embodiment of an associative memory cache system in accordance with the present invention.
Figure 2B:
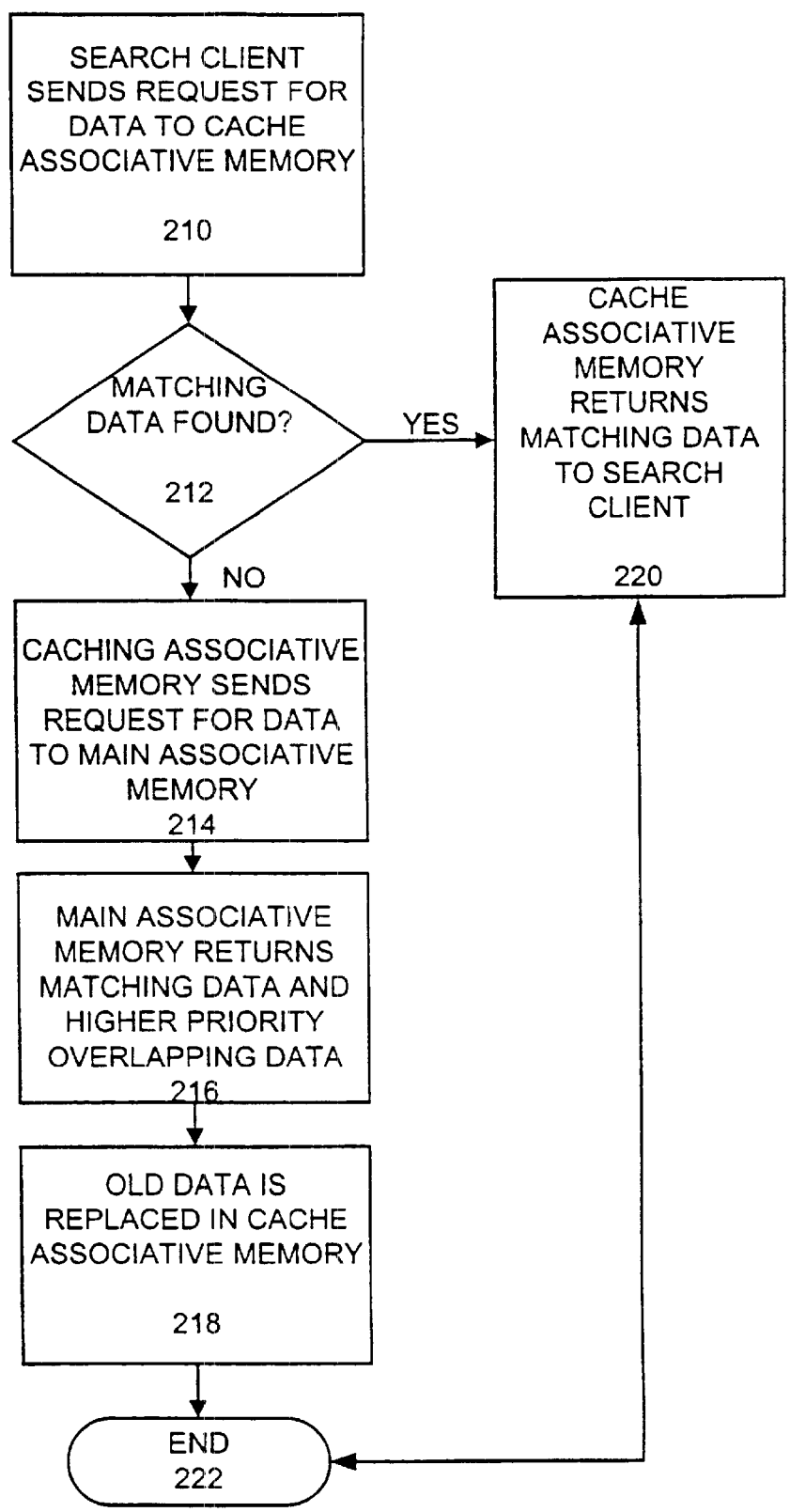
FIG. 2B is a flow chart of a method describing operations steps of associative memory cache.

FIGS. 2A and 2B are a block diagram of one embodiment of an associative memory cache system and one embodiment of a method of operation of an associative memory cache system in accordance with the present invention. The system includes a search client 208, a main associative memory device ("main associative memory") 202, an associative memory bus 204, and an associative memory cache ("cache associative memory") 206, such as a content addressable memory (CAM). The main associative memory 202 and the associative memory cache 206 are coupled to each other via the associative memory bus 204.

The main associative memory 202 permits the contents of memory to be searched and matched to retrieve data from the memory. The main associative memory 202 is a conventional associative memory, such as a CAM, or any equivalent implementation, such as an algorithmic search of an SRAM or DRAM. Associative memory cache 206 is an associative memory cache device having replacement logic to manage the replacement of the cached data. Associative memory bus 204 is a bus optimized to perform set replacements of data when no matching data is found. The search client 208 can be a central processing unit, a network processor, or a network processing system.

Referring now to FIG. 2B, there is shown one embodiment of a method of operating an associative memory cache system. Initially the search client 208 sends (210) out a search request to the associative memory cache 206. If there is a miss (212) in the associative memory cache 206, i.e., no matching data is found there, the associative memory cache 208 generates (214) a search request to the main associative memory 202. The main associative memory returns (216) to the search client 208 a matching entry (a search result) and the cluster of a higher priority overlapping entries. The associative memory bus 204, in turn, performs (218) replacements of data in the associative memory cache 206 when no match is found. Alternatively, if the searched data is present in the associative memory cache 206, it is returned (220) to the search client 208. The process ends in 222.

Figure 3:
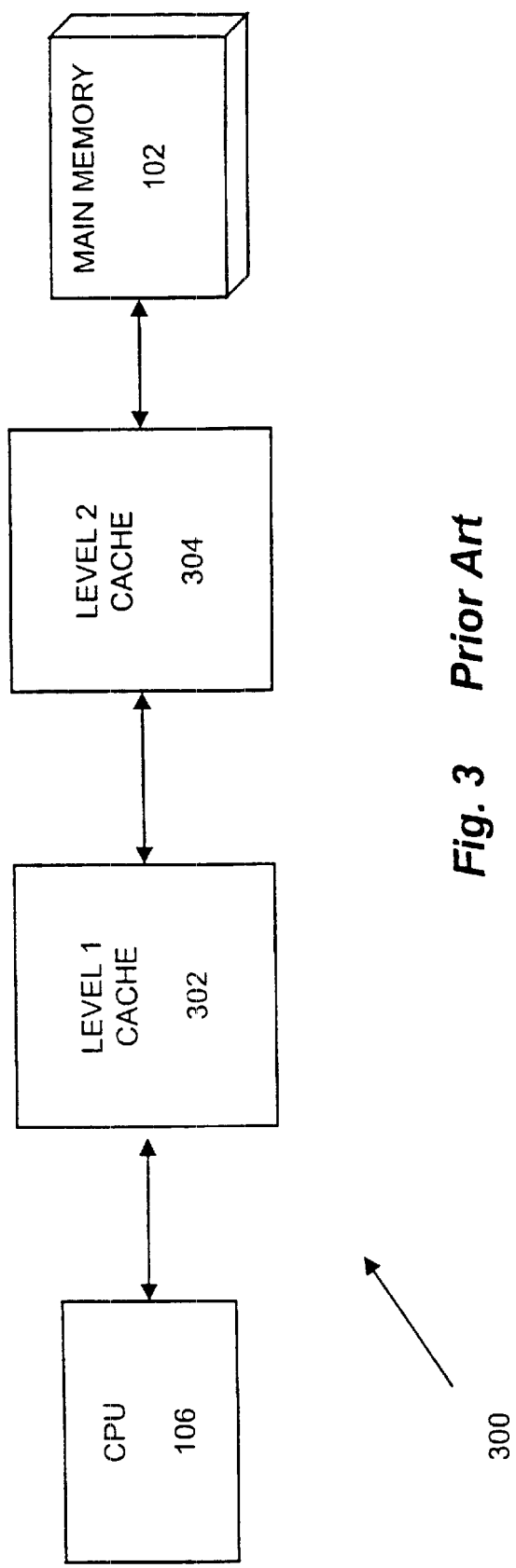
FIG. 3 is a block diagram of a conventional multi-level cache memory system.

Referring now to FIG. 3 there is shown a conventional multi-level cache memory system 300. The system 300 includes a central processing unit (CPU) 106. The CPU 106 is associated with a Level 1 cache element 302, which is configured to cache the instructions or data. The Level 1 cache element 302 is coupled to a Level 2 cache element 304, which is also configured to cache the instructions or data. The Level 2 cache element 304 is connected to a main memory 102. The main memory 102 is a conventional random access (RAM) memory to store commands generated by the CPU 106. The Level 1 cache element 302 and Level 2 cache element are conventional static random access memory (SRAM), or a dynamic random access memory (DRAM). The CPU 106 is preferably a conventional microprocessor, such as a Pentium II (Intel Corporation, Santa Clara, Calif.) or generally equivalent processor. The CPU 106 sends a request for an instruction or data. If the instruction or data is in the Level 1 cache element 302, it is supplied directly to the CPU 106. This situation is a HIT. If the instruction or data is not present in the Level 1 cache element 302 (i.e., a MISS occurred), the CPU 106 looks for data in Level 2 cache element 304. If the instruction or data is not found there either, then the CPU 106 looks for the data in the next element in the memory hierarchy. If it is found there, the data is returned to the CPU 106. Otherwise, main memory 102 supplies the data to the CPU 106.

Figure 4:
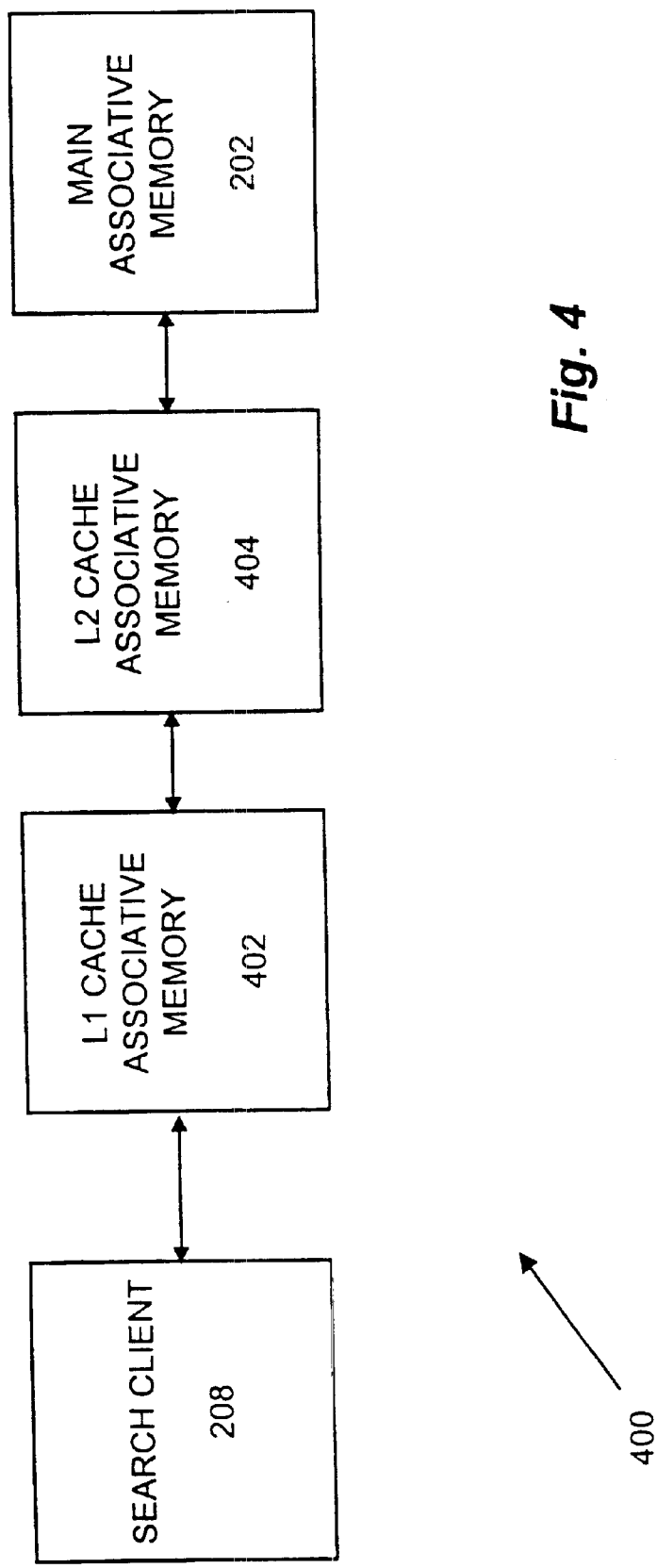
FIG. 4 is a block diagram of one embodiment of a multi-level associative memory cache system in accordance with the present invention.

Referring now to FIG. 4, there is shown a block diagram illustrating one embodiment of a multi-level associative memory cache system 400. The system 400 comprises a search client 208, an L1 associative memory cache element 402, an L2 associative memory cache element 404, and a main associative memory 202.

The search client 208 is a conventional search server for providing lookup services. The search client 208 can be a central processing unit, a network processor or a network processing system. L1 associative memory cache element 402 and L2 associative memory cache element 404 are associative memories having replacement logic to manage the replacement of the cached entries. The search client is connected to L1 associative memory cache element 402, which, in turn, is connected to L2 associative memory cache element 404. The L2 associative memory cache element 404 is connected to the main associative memory 202. The main associative memory 202 permits the contents of memory to be searched and matched to retrieve data from the memory and is a conventional associative memory, such as a CAM, or any equivalent implementation, such as an algorithmic search of an SRAM or DRAM.

Figure 4A:
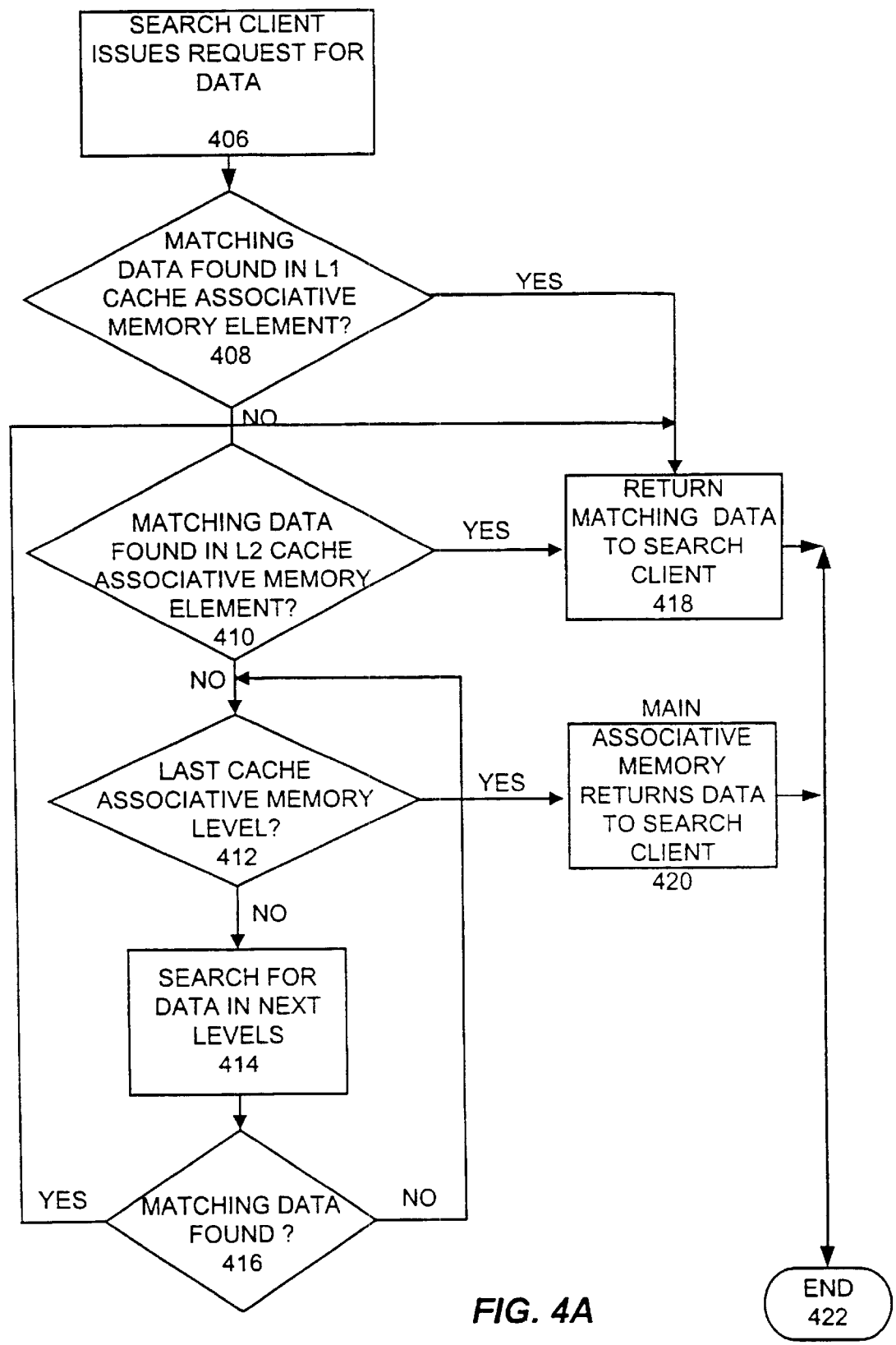
FIG. 4A is a flow chart of a method describing operation steps in a multi-level associative memory cache system.

Referring now to FIG. 4A, there is shown one embodiment of a method of operation of a multilevel associative memory cache system. The search client 208 sends (406) a search request for a matching entry. Then, in step 408 the process determines whether the matching entry is in L1 associative memory cache. If the matching entry is in L1 associative memory cache element 402, the search result is supplied (418) directly to the search client. This situation is a HIT. If the matching entry is not present in L1 associative memory cache element 402, the L1 associative memory cache element 402 searches (410) for data in L2 associative memory cache element 404. If the matching entry is not present in L2 associative memory cache element 404 either, the L2 associative memory cache element 404 searches (414) for it in the next element in the memory hierarchy. If it is found there (416), the search result is returned (418) to search client and the process ends (422). Otherwise, the main associative memory 202 returns (420) the data to the search client 208 and the process ends (422).

Figure 5:
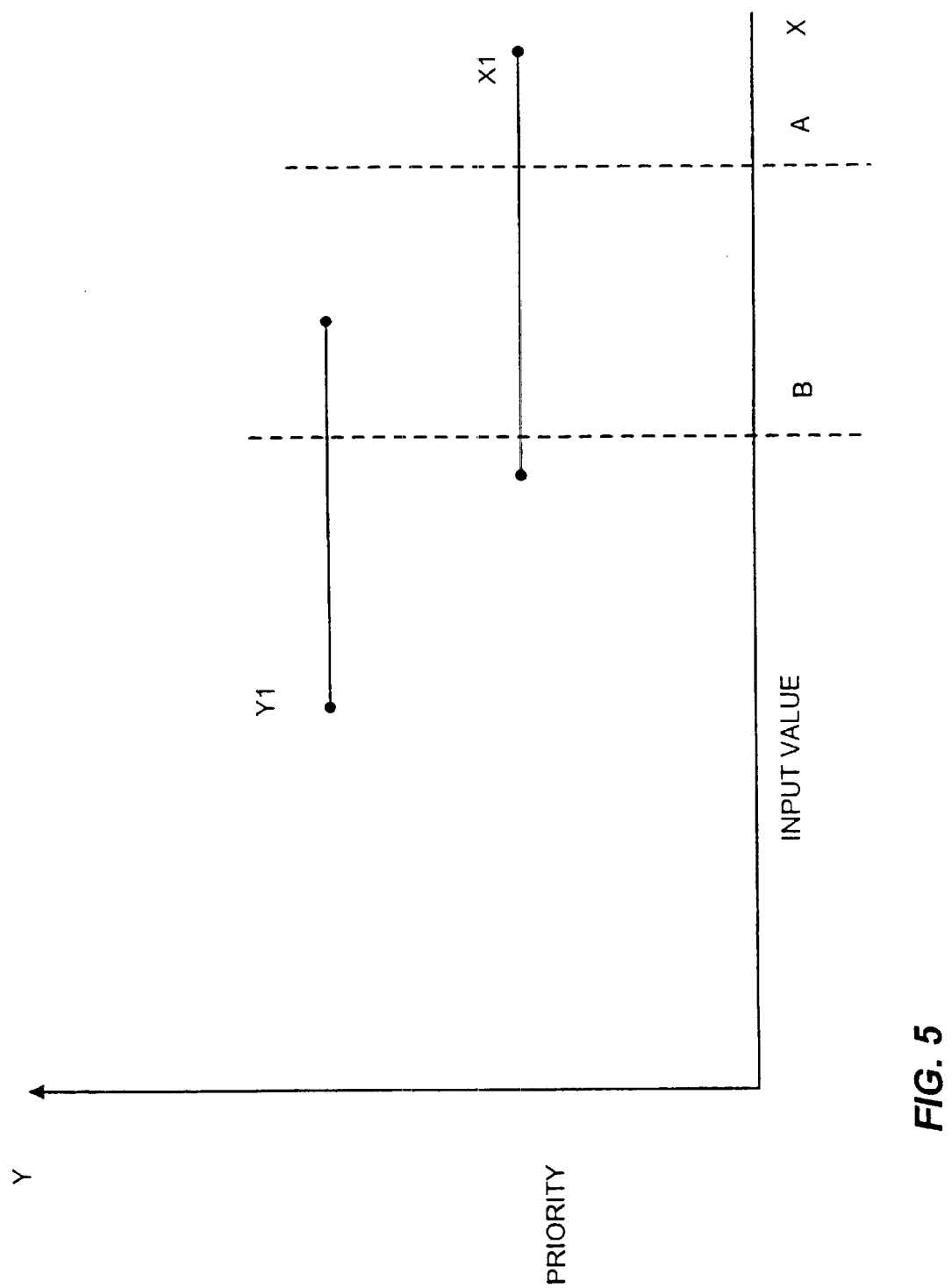
FIG. 5 is a histogram of one embodiment of a function of priority and value of input signals.

Now referring to FIG. 5, there is illustrated a histogram of one embodiment of a function of priority of signals and input value of signals. X is a horizontal axis showing input values of signals, or an input range. Y is a vertical axis illustrating priority of signals, where priority increases on axis Y. X1 is a matching signal covering the entire range. Y1 is a higher priority overlapping signal not covering the entire range. When there is a hit on range X1, every overlapping higher priority signal should be treated as though there is hit on it as well. Suppose, the search client (not shown) issues a search request for X1 and X1 was not found in the associative memory cache (i.e., there was a MISS situation). Therefore, X1 entry will be pulled into the associative memory cache from the main associative memory (not shown). Value "A" represents the input value on the X1 range. Y1 is a higher priority overlapping entry Y1 not covering the entire range. Value "B" represents the input value on Y1 entry range and X1 entry range. When the input value B is received, it is believed that X1 entry is the correct match because B is within the range covered by X1. However, B is also within the range covered by Y1. Consequently, both the matching entry X1 and a higher priority overlapping entry Y1 have to be pulled into the associative memory cache to ensure accurate results.

This "overlapping range" phenomenon can be illustrated with the example of an Internet Protocol (IP) Routing Table. In the case of an IP routing table there could be multiple entries that may match a single input. In the IP routing table there are host addresses where all of the bits in the IP address are used as well as multiple overlapping network ranges. Suppose, the host address represents Y1 on the histogram. Entry Y1 is the overlapping higher priority entry. A network address represents X1 entry on the histogram. When the search client (not shown) issues a search request for a matching entry, i.e., a network address, to the associative memory cache (not shown) and no matching entry is found (i.e. a MISS situation), the search client issues a search request to the main associative memory (not shown). The network address, which represents value A on the histogram, is then pulled into the associative memory cache. When the information packet addressed to the host address arrives, the cached network address is present in the associative memory cache. When the input value B is received, it is believed that X1 entry (a network address) is the correct match because B is within the range covered by X1. However, B is also within the range covered by Y1. Therefore, using the cached network address for routing as the matching entry will be misleading because the information packet is addressed to the host address, but not to the cached network address. Thus, when there was initially a MISS on the network address entry X1, that network entry along with all higher priority entries, such as the host address entry Y1, needs to be pulled into the associative memory cache as to avoid getting false results. Accordingly, when there is a MISS situation in the associative memory cache, a cluster of entries need to be replaced. The function of replacement logic in the associative memory cache is described below in more detail with reference to FIG. 6.

Figure 6:
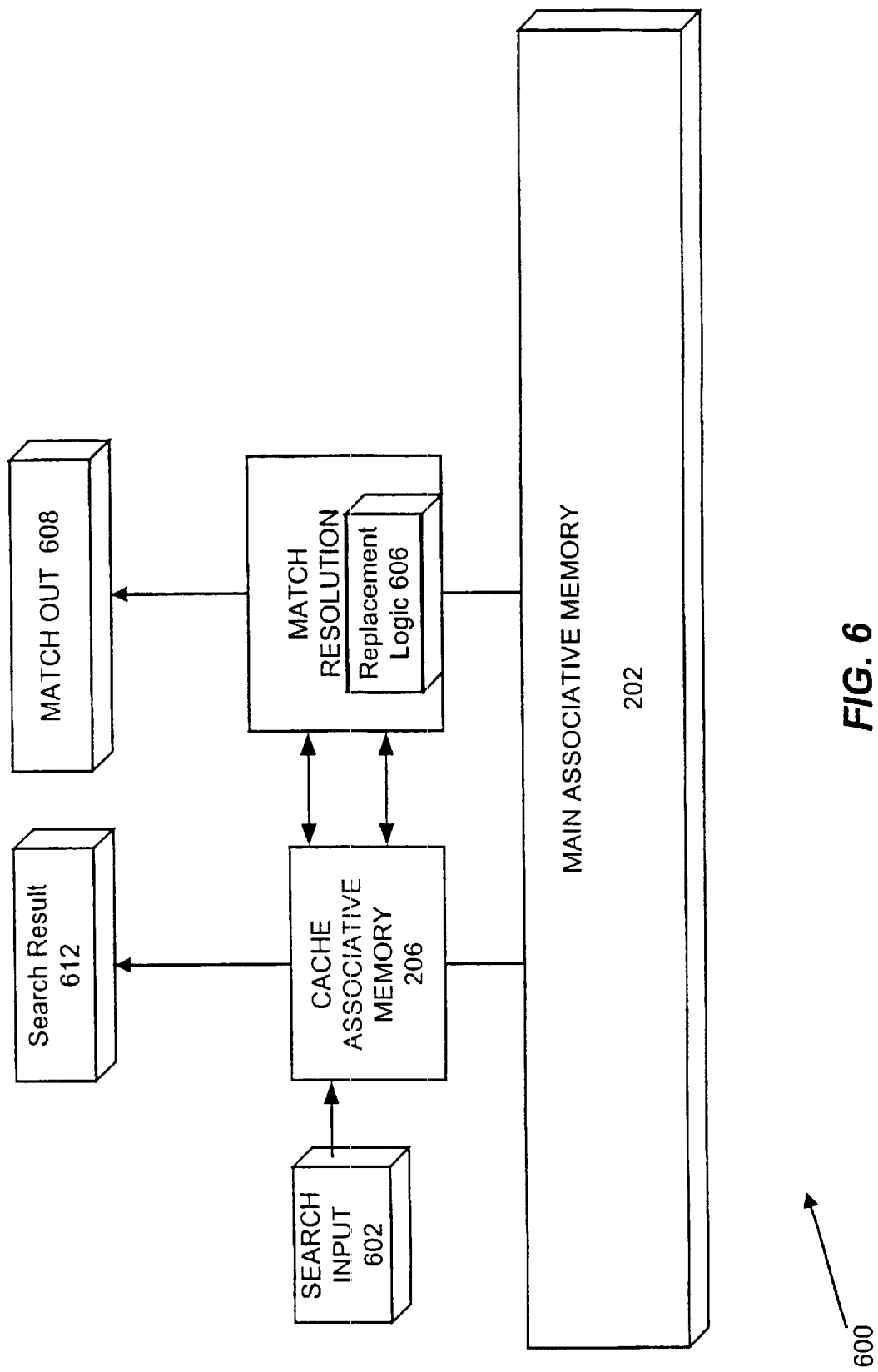
FIG. 6 is a detailed block diagram of one embodiment of an associative memory cache system in accordance with the present invention.

Now referring to FIG. 6, there is shown a detailed block diagram of one embodiment of an associative memory cache system 600. The system 600 comprises an associative memory cache 206 coupled to receive a search input 602 generated by a search client (not shown). The associative memory cache 206 receives the search input 602. If there is a MISS in the associative memory cache 206, i.e., no data is found there, the associative memory cache 206 issues a search request for a matching entry to the main associative memory 202. The main associative memory 202 then generates a match signal (not shown) for all data items that match The main associative memory 202 then outputs the match signal and the priority field (not shown) to the match resolution circuit 604. Such resolution circuit is described in U.S. patent application Ser. No. 09/636,131, entitled "Match Resolution Circuit For Associative Memory," by Alex E. Henderson, Walter E. Croft, Raymond M. Chu, and Vishal Sarin, which patent application was filed on Aug. 10, 2000 and is incorporated herein by reference in its entirety.

The replacement logic 606 is configured to replace old data in the associative memory cache 206 with the new data located in the main associative memory 202. As discussed above with regard to FIG. 5, a typical search may result in finding a plurality of data items matching the search input. Anytime there is a hit on the range X1, every overlapping higher priority signal should be treated as though there is hit on that signal as well. The replacement logic 606 advantageously allows performing a set-oriented replacement of entries. Such set-oriented replacement helps to avoid getting false results because of the overlapping range phenomenon. Conventional algorithms for replacement of old data in a conventional cache system are known. Two of the most widely used algorithms are Least Recently Used (LRU), or Least Frequently Used (LFU). The existing LRU algorithm and modified LRU and LFU algorithms are described below in more detail with reference to FIGS. 7–14.

Figure 7:
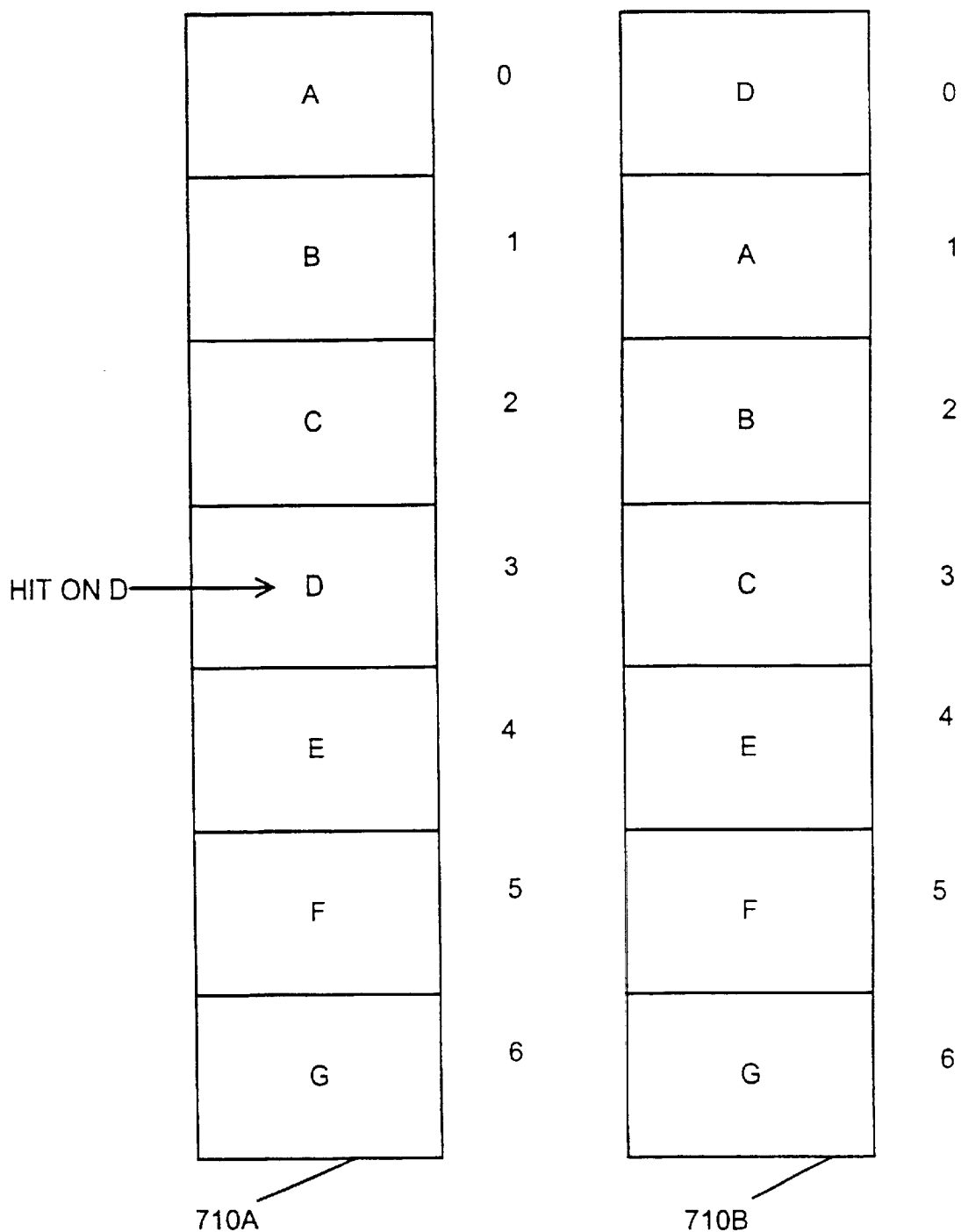
FIG. 7 is a block diagram of the implementation of a conventional least recently used (LRU) algorithm for replacement of old data in a conventional cache memory system.

Now referring to FIG. 7, there is shown the implementation of a conventional least recently used (LRU) algorithm for replacement of data in a conventional cache memory. The conventional cache memory (not shown) maintains an ordered list 710A of all the entries that are currently in the cache memory. The ordered list 710A represents the list before a HIT situation occurs. Ordered list 710B represents the list after a HIT occurs. There are seven entries shown on the list 710A. All the entries are labeled from A to G and numbered 0 through 6 sequentially. Each number corresponds to the entry position on the list. Suppose entry D is a matching entry. That entry is then shifted to the top of the list as shown in 710B. Entries A, B and C are more recently used entries on the list 710A than entry D. Consequently, A, B, and C are moved one position below on the list so that A assumes the first position, B assumes the second position, and C assumes the third position as shown in 710B. Entries, E, F, and G are less recently used entries than D. These entries do not change their position on the list 710. Accordingly, entry E remains in the fourth position, entry F remains in the fifth position, and entry G remains in the sixth position. Thus, according to the implementation of the conventional LRU algorithm, entries are shifted in the memory.

Figure 8:
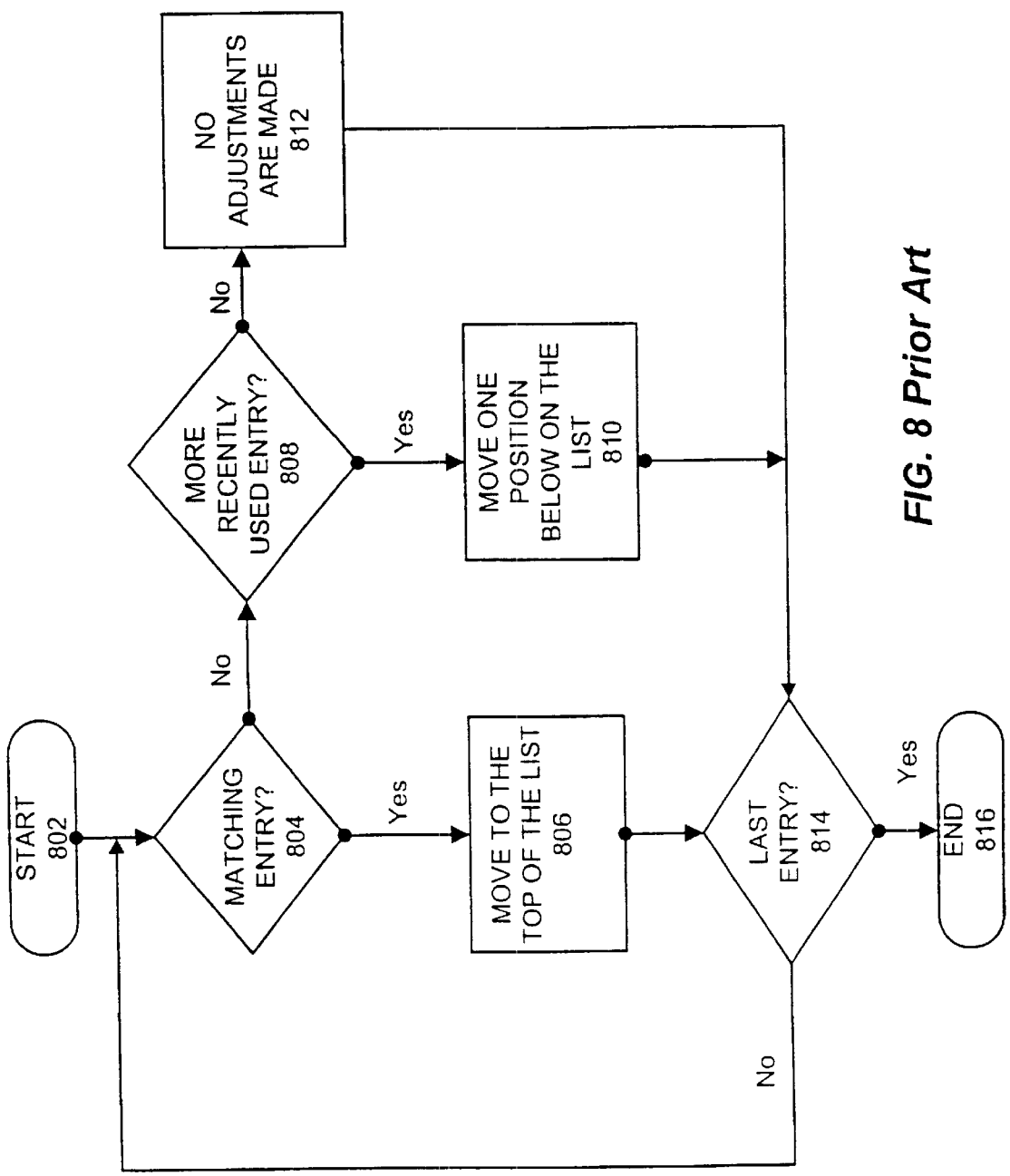
FIG. 8 is a flow chart illustrating a conventional least recently used (LRU) algorithm for replacement of old data in a conventional cache system.

FIG. 8 is a flow chart illustrating a conventional least recently used (LRU) algorithm for replacement of old data in a conventional cache system. The process starts 802 and determines whether an entry is a matching entry 804. If the entry is the matching entry, it is shifted to the top of the list to the most recently used position in step 806. Then the process determines 814 whether the current entry is the last entry. If it is the last entry, then the process ends 816. Otherwise, the process loops back to 804. If the entry was not a matching entry in step 804, the process determines 808 whether the entry is a more recently used entry than the matching entry. The more recently used entry is shifted 810 one position below its previous position on the list 710 responsive to the current entry being a more recently used entry. Then the process loops back to 814 to determine whether the current entry is the last entry. If it is the last entry, the process ends 815. In the alternative, the process loops back to 804. Responsive to the entry not being a more recently used entry in step 808, the process does not make any adjustments to the position of that entry on the list 710 in step 812. Thus, conventional LRU algorithm allows finding least recently used entries by shifting the entries in the Cache RAM.

Figure 9:
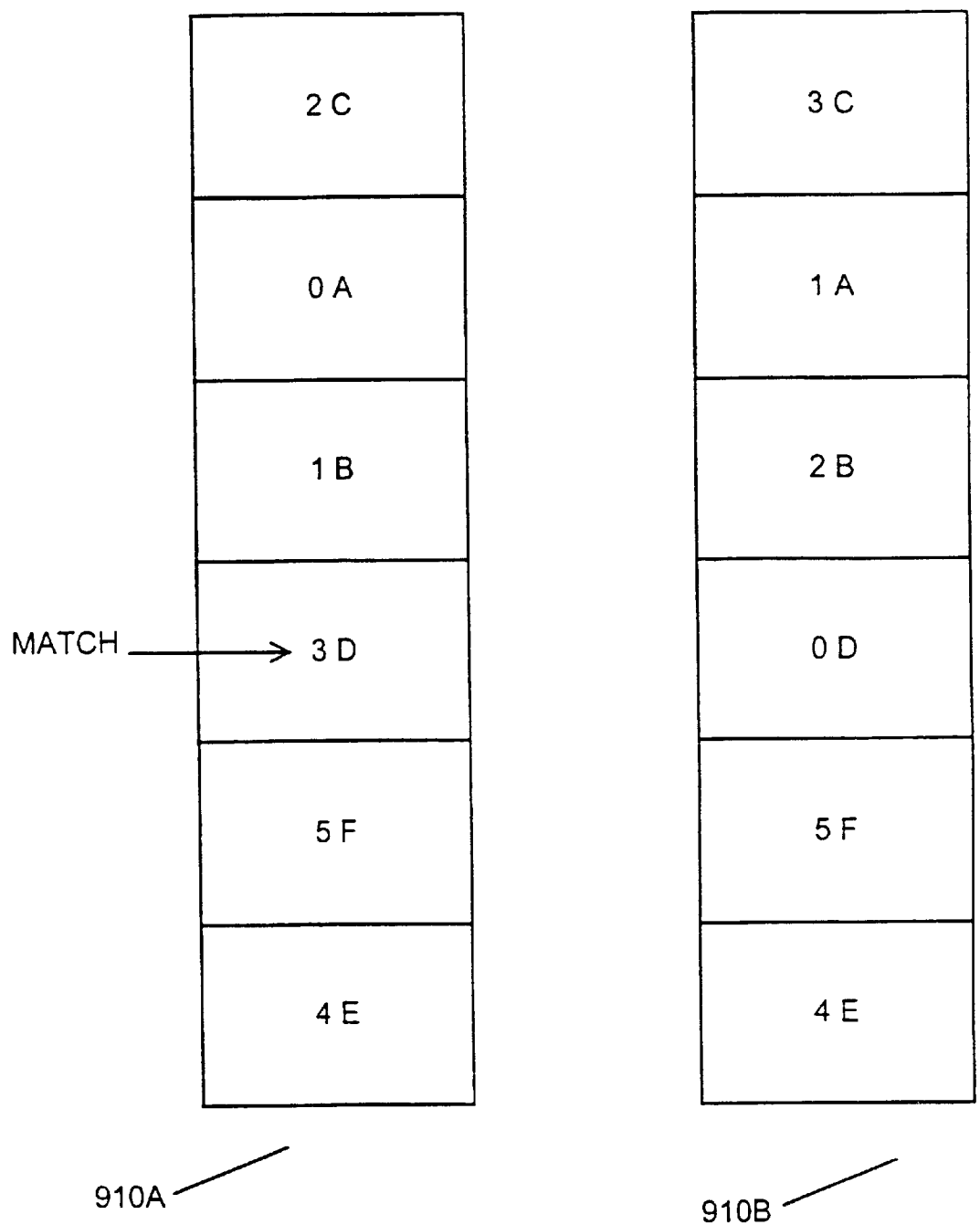
FIG. 9 is a block diagram one embodiment of the implementation of the modified LRU algorithm for replacement of old data in an associative memory cache system for one entry.

Now referring to FIG. 9, there is shown one embodiment of the implementation of a modified least recently used (LRU) algorithm for associative memory cache in accordance with the present invention. FIG. 9 includes an array 910A tied to the entries in the associative memory cache before a HIT situation occurs. Array 910B represents an array after a HIT occurs. The array 910A is designed to keep position of entries on the list 710, rather than to keep a sorted list 710 where entries can be moved. In one embodiment of the present invention, the array 910A has a size of 16K. The positions of entries can be scattered in any order in the array 910A. According to the implementation of the modified LRU algorithm of one embodiment of the present invention, every matching entry in the associative memory cache is loaded with a zero, which reflects a new position of the matching entry. Thus, according to the block diagram, the matching entry D is assigned zero. All other entries that are more recently used entries than D become incremented by a constant value, for example by one. Accordingly, A, B, and C assume one position lower than their original position as shown in 910B. All the entries that were less recently used than entry D, i.e., E, F, and G do not change their position, as shown in 910B. As discussed above in regard to FIG. 5, a typical associative memory cache search may result in finding a plurality of data items that match the search input. Anytime there is a hit on one range, every overlapping higher priority entry should be treated as though there is hit on it as well. Consequently, when having multiple HITs, instead of moving just one entry, all overlapping entries should be shifted as well in order to achieve best results. The conventional LRU algorithm does not work very well when moving a cluster of entries, instead of just one. The modified LRU algorithm allows working with a cluster of entries at once by changing the values that determine their position on the list 710, instead of moving the data itself.

Figure 10:
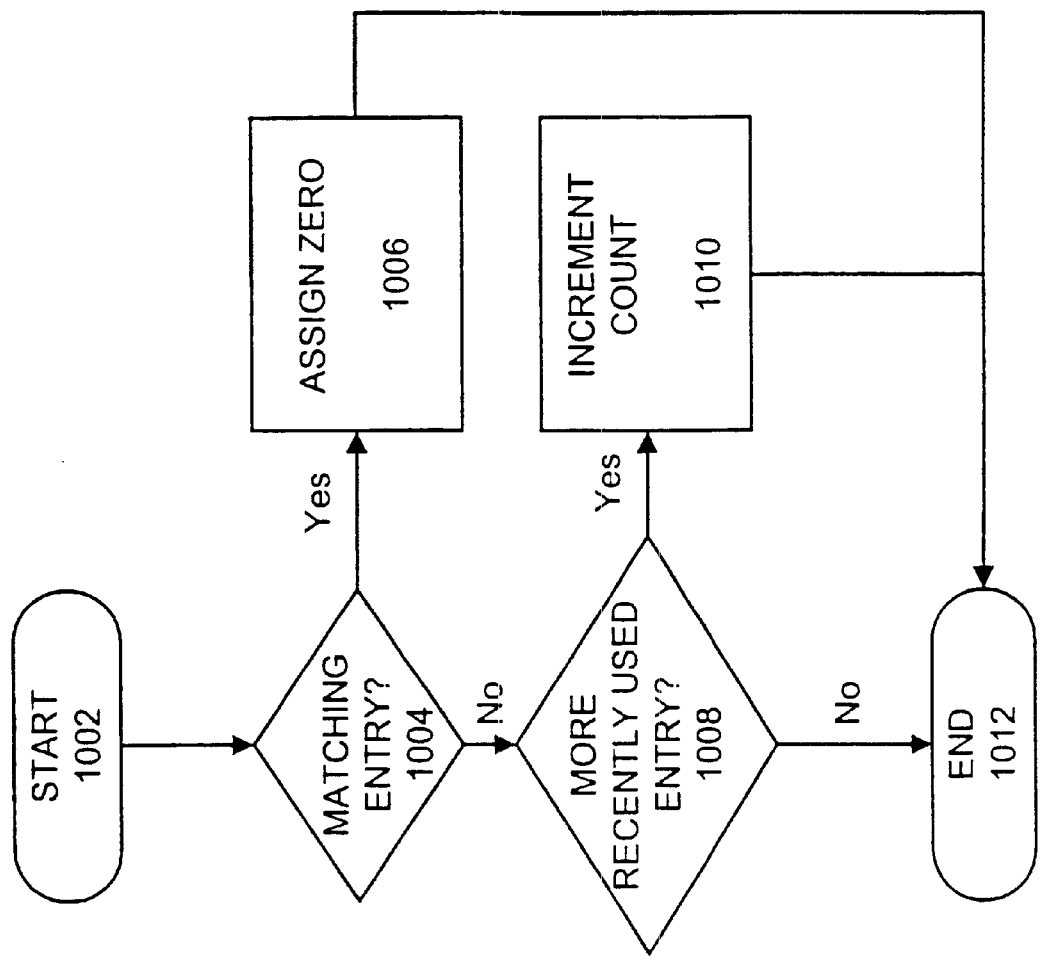
FIG. 10 is a flow chart of one embodiment of the modified LRU algorithm for replacement of old data in an associative memory cache system for one entry.

Referring now to FIG. 10, there is shown a flow chart of one embodiment of the modified LRU algorithm for replacement of old data in a associative memory cache system for one entry in accordance with the present invention. The process starts 1002 and determines 1004 whether the current entry is a matching entry, i.e., the entry in the associative memory cache 205 that corresponds to the search request sent by the search client 208. The process assigns zero to the position of the matching entry responsive to the entry in the associative memory cache being a matching entry in step 1006. Then, the process ends 1012. Alternatively, the process determines 1008 whether the current entry is a more recently used entry than the matching entry. The process increments the count by a constant value responsive to the entry being a more recently used entry than the matching entry in step 1010. That is, the process assigns a lower position in the array 900 to the entry that is more recently used that the matching entry. The process does not adjust the position of an entry responsive to the determination that a current entry is not a more recently used entry in step 1008. Then, the process ends 1012. As was discussed with regard to FIG. 9, according to the implementation of one embodiment of the modified LRU algorithm, the matching entry D is assigned a zero position in the array 900. Entries A, B, and C assume one position lower than their original position, whereas other entries that were less recently used than D do not change their position in the array. The modified LRU algorithm advantageously allows changing positions of multiple entries without shifting the entries themselves.

Figure 11:
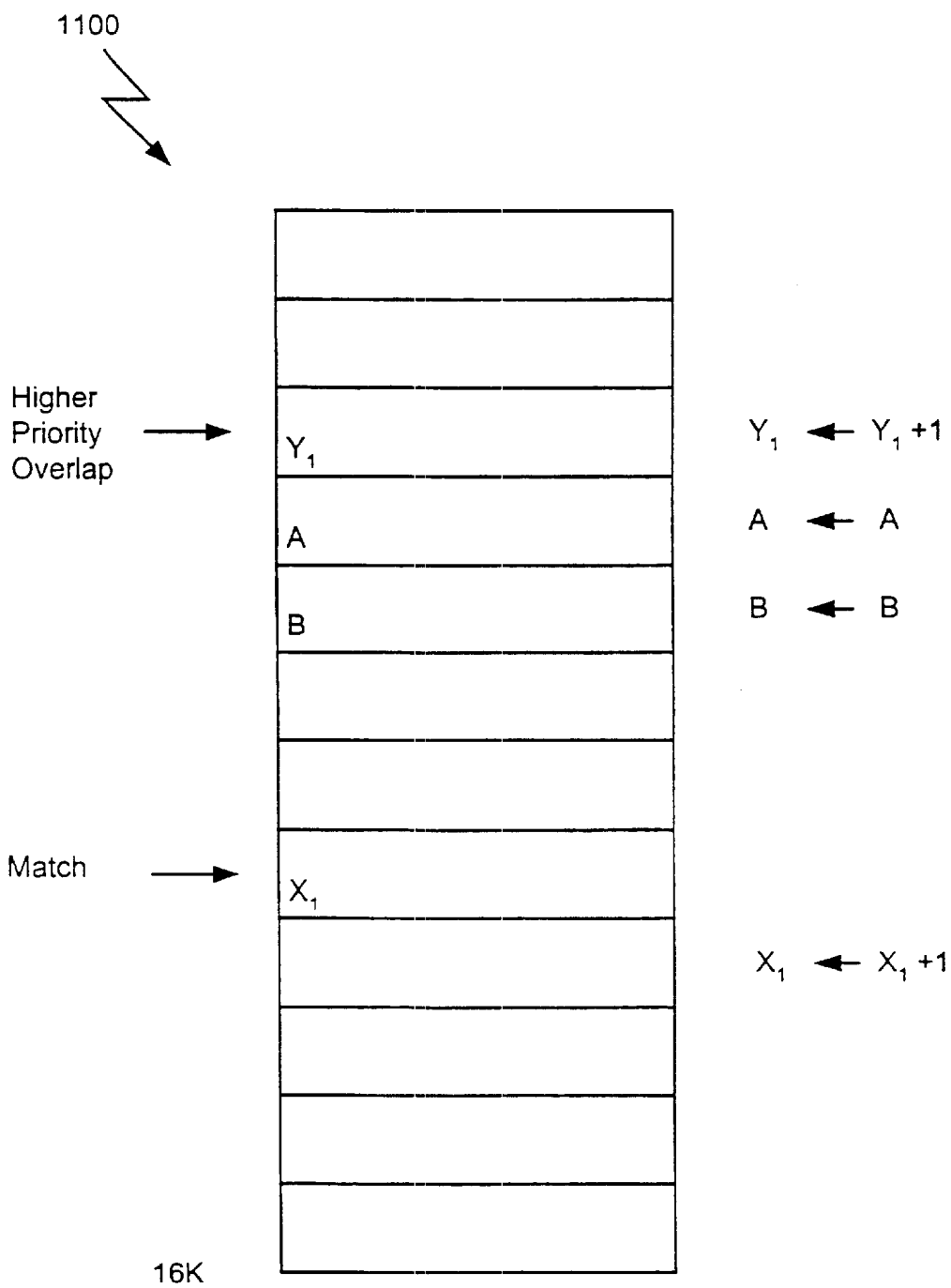
FIG. 11 is a block diagram of one embodiment of the implementation of the modified Least Frequently Used (LFU) algorithm for replacement of data in an associative memory cache system for one entry.

Referring now to FIG. 11, there is shown one embodiment of the implementation of the Least Frequently Used (LFU) algorithm for replacing data in an associative memory cache in accordance with the present invention. An array 1100 tied to the entries in the associative memory is designed to keep the frequency of use of entries on the list 710, rather than to keep a sorted list 710 where entries can be moved. In one embodiment of the present invention, the array 1100 has a size of 16K. The frequency of use of entries can be scattered in any order in the array 1100. As discussed in regard to FIG.

5, anytime there is a HIT on range X1, it is important to consider range Y1 because of the overlapping range phenomenon. Consequently, keeping the number of the frequency of use advantageously allows working with the cluster of entries at once. According to the implementation of one embodiment of the present invention of the modified LFU algorithm of one embodiment of the present invention, every matching entry in the associative memory cache, i.e., entry X1, and all the entries Y1 that overlap X1 range are incremented by a constant value, for example, one. All other entries that do not overlap this range stay the same. As a result, the array 1100 represents a histogram of the frequency of access of entries in the associative memory cache. When there is a MISS in associative memory cache, the entries with the lowest frequency number are selected for replacement. Thus, the LFU modified algorithm for associative memory cache advantageously allows replacing a cluster of entries in a given time, unlike in the conventional cache system, where only one entry can be replaced at a time.

Figure 12:
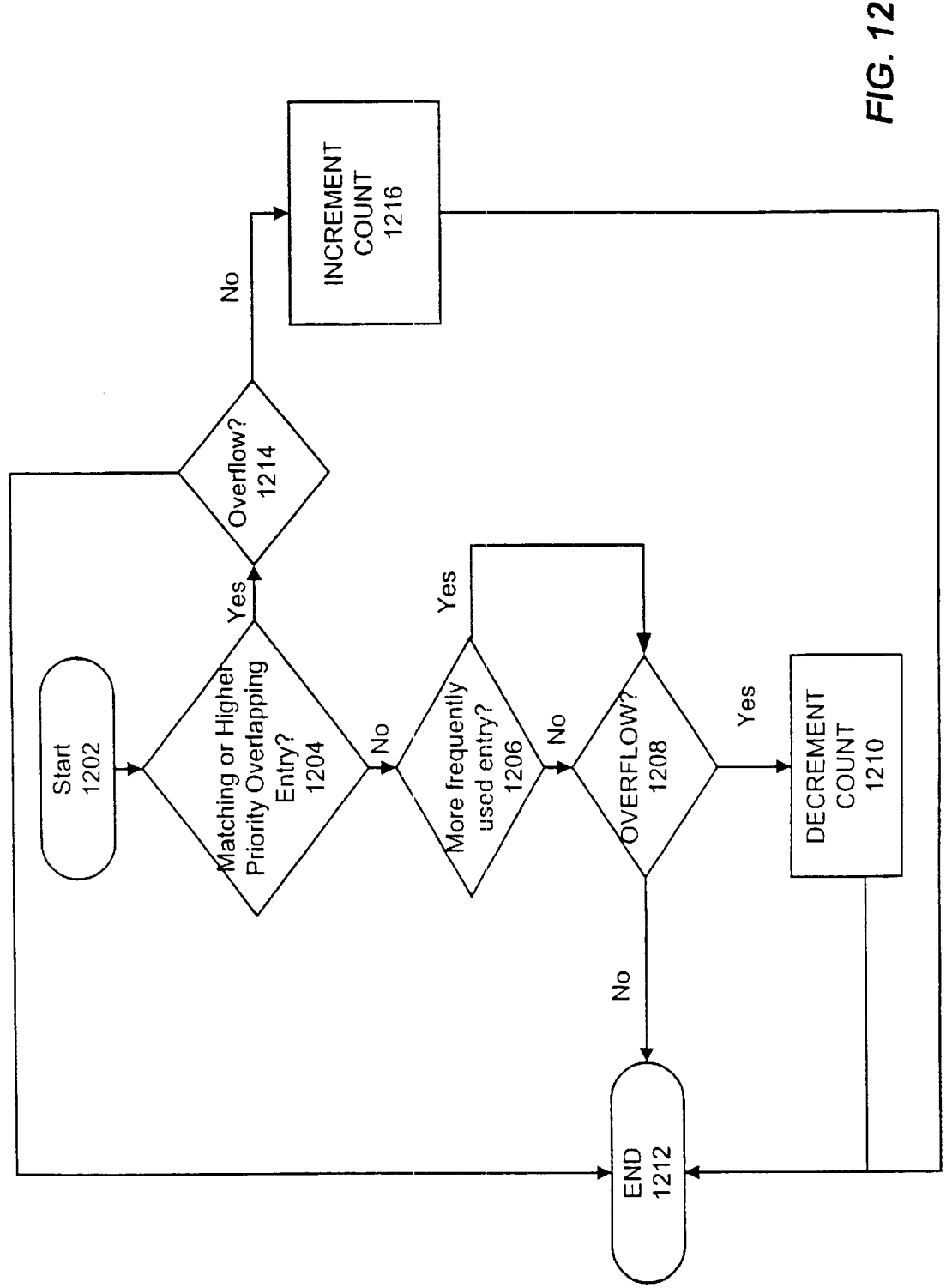
FIG. 12 is flow chart of one embodiment of the modified LFU algorithm for replacement of data in an associative memory cache system for one entry.

Referring to FIG. 12, there is shown a flow chart of one embodiment illustrating a modified LFU algorithm for replacement of data in an associative memory cache for one entry in accordance with the present invention. The process starts in 1202 and determines 1204 whether the current entry is a matching entry or a higher priority overlapping entry. Responsive to the entry being a matching or a high priority overlapping entry, the process determines whether there is an overflow in 1214. If the answer is negative, the process increments the count in 1215 and ends in 1212. If there is an overflow, the process ends in 1212. If it is a non-matching entry, then the process determines in 1206 whether the entry is a more frequently used entry. If it is a more frequently used entry, the process determines whether there is an overflow in step 1208. An overflow will occur if the increment would result in a 0. If there is no overflow, the process does not make any adjustments to that entry and the process ends 1212. Alternatively, if there is an overflow, then the process decrements the count in 1210. Thus, the entries with the smallest frequency number are selected for replacement.

Figure 13:
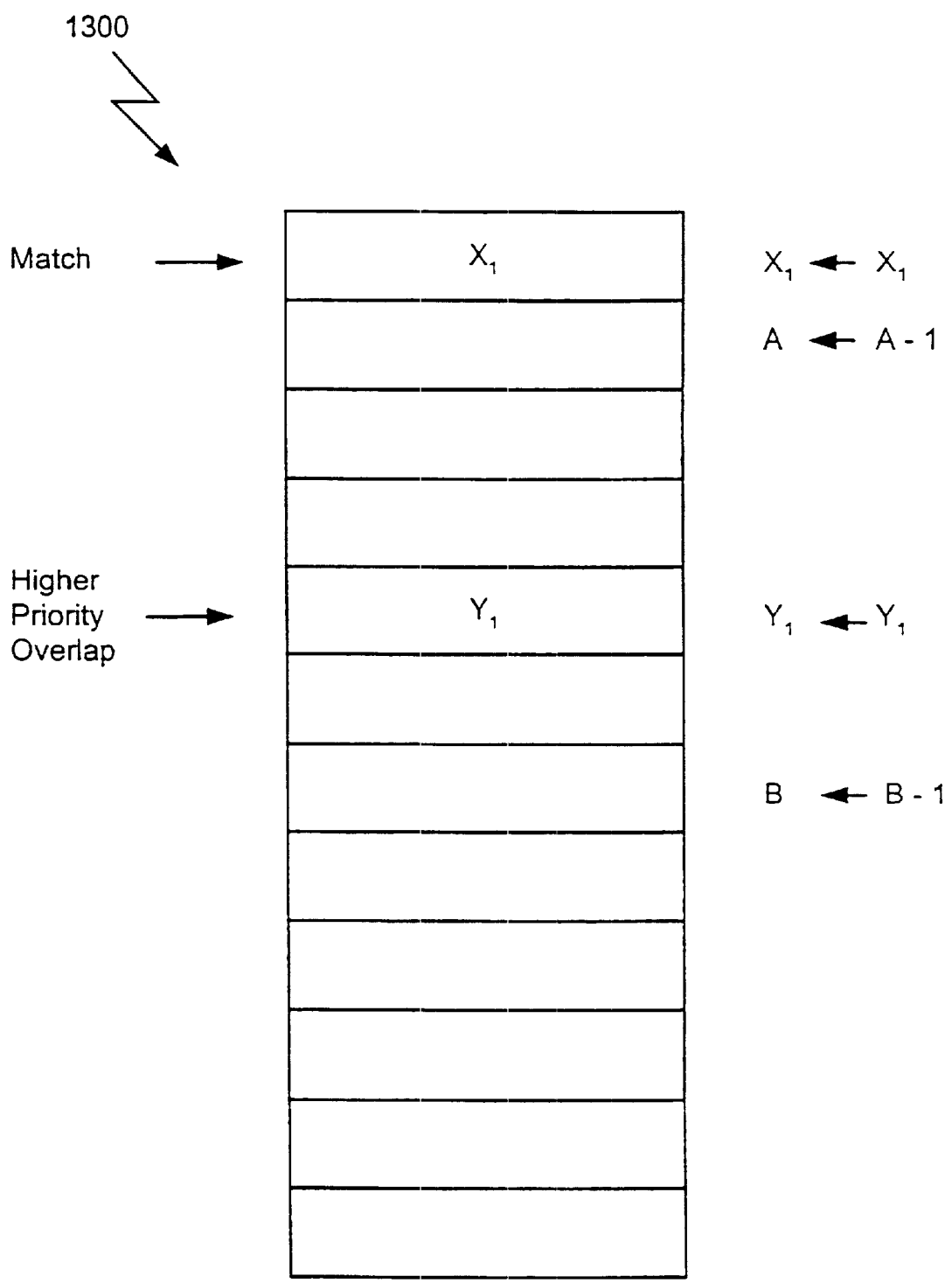
FIG. 13 is a block diagram of another embodiment of the implementation of the modified LFU algorithm for replacement of data in an associative memory cache system for one entry.

Referring now to FIG. 13, there is shown another embodiment of the implementation of the Least Frequently Used (LFU) algorithm for replacing data in the associative memory cache in accordance with the present invention. An array 1300 tied to the entries in the associative memory is designed to keep the frequency of use of entries on the list 710, rather than to keep a sorted list 710 where entries can be moved. In one embodiment of the present invention, the array 1300 has a size of 16K. The frequency of use of entries can be scattered in any order in the array 1300. As discussed in regard to FIG. 5, anytime there is a HIT on range X1, it is important to consider range Y1 because of the overlapping range phenomenon. Consequently, keeping the number of the frequency of use allows working with the cluster of entries at once. According to the implementation of the modified LFU algorithm of another embodiment of the present invention, every matching entry in the associative memory cache, i.e., entry X1, and all the entries Y1 that overlap X1 range stay the same, i.e., their frequency of use is not adjusted. In contrast, all non-matching and non-overlapping higher priority entries are incremented by a constant number, for example, one. As a result, the array 1300 represents a histogram of the frequency of access of entries in the associative memory cache. When there is a MISS in associative memory cache, the entries with the lowest frequency number are selected for replacement. Thus, the LFU modified algorithm for associative memory cache advantageously allows replacing a cluster of entries in a given time, unlike in the conventional cache system, where only one entry can be replaced at a time.

Figure 14:
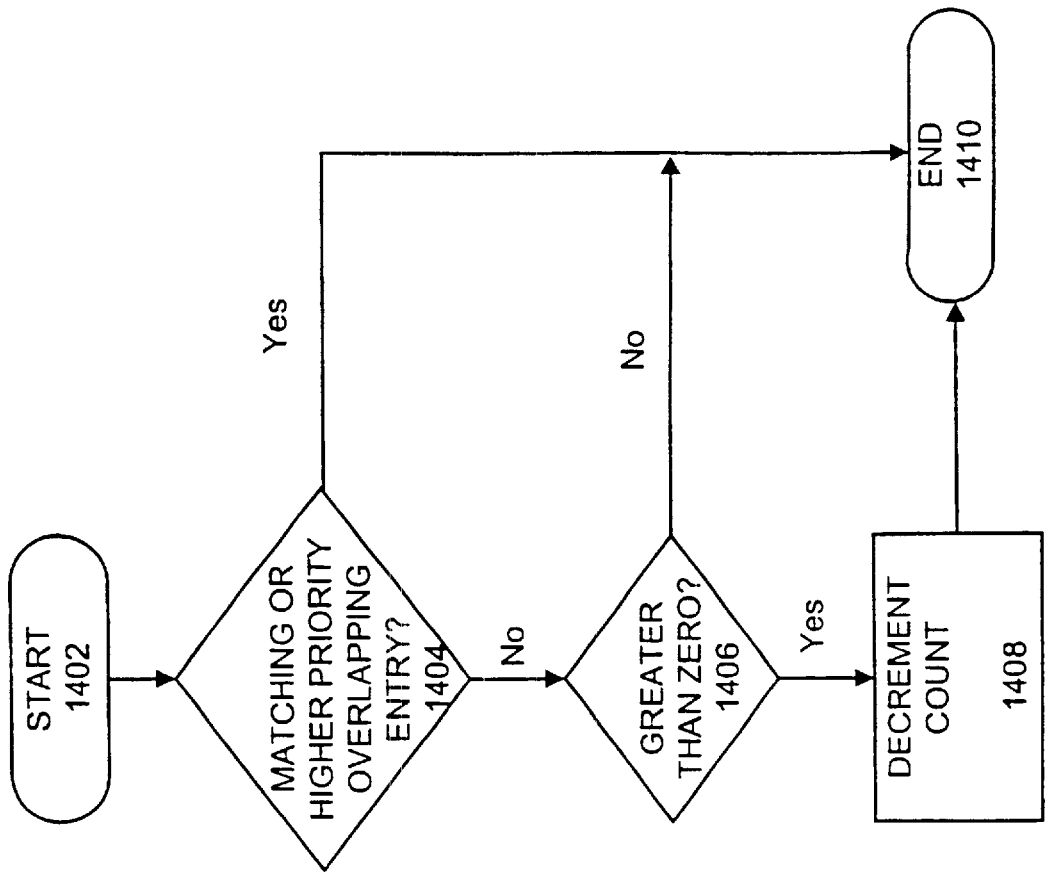
FIG. 14 is a flow chart of another embodiment of the modified LFU algorithm for replacement of data in an associative memory cache system for one entry.

FIG. 14 shows a flow chart of another embodiment illustrating a modified LFU algorithm for replacement of data in accordance with the present invention. The process starts in 1402 and determines in 1404 whether the entry is a matching or a higher priority overlapping entry. If the entry is a matching or a higher priority overlapping entry, then the entry will not be adjusted and the process ends 1410. Alternatively, if the entry is not a matching or a higher priority overlapping entry the process the process determines whether the frequency number is still greater than zero in step 1405. Then, the process decrements the count 1408 in response to the determination that the number of frequency of use is still greater than zero. Then, the process ends 1410. If the number is not greater than zero in step 1406, the process ends 1410 without readjusting the entry. Thus, the matching and higher priority entries stay the same, whereas all other entries have their count decremented. As a result, entries which are less frequently used will be selected for replacement.

From the above description, it will be apparent that the invention disclosed herein provides a novel and advantageous system and method for caching associative memory. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for operating an associative memory cache device, comprising:
    a search client for issuing a search request for data, the data having an associated priority;
    an associative memory cache element, coupled to the search client, for returning the requested data; and
    an associative memory element, coupled to the associative memory cache element, for returning a first set of data, responsive to not finding the requested data in the associative memory cache element, the first set of data including the requested data and data having an associated priority higher than the associated priority of the requested data.

2. The system of claim 1, further comprising a replacement logic, coupled to the associative memory cache element, for replacing a second set of data in the associative memory cache element with the first set of data, wherein the second set of data comprises:
    previously cached requested data having an associated priority; and
    previously cached data having an associated priority higher than the associated priority of the previously cached requested data.

3. The system of claim 1, wherein the search client is a central processing unit.

4. The system of claim 1, wherein the search client is a network processing system.

5. The system of claim 1, wherein the data having the associated priority higher than the associated priority of the requested data has a longer prefix match in an IP routing table than data having an associated priority lower than the associated priority of the requested data.

6. The system of claim 1, wherein the data having the associated priority higher than the associated priority of the requested data holds a higher position in an access control list than data having an associated priority lower than the associated priority of the requested data.

7. The system of claim 1, wherein the associative memory element is simulated by using an algorithmic search on RAM.

8. The system of claim 7, wherein the algorithmic search is a hashing engine.

9. The system of claim 7, wherein the algorithmic search is a binary tree.

10. The system of claim 7, wherein the algorithmic search is a sorted table search engine.

11. The system of claim 7, wherein the algorithmic search is binary tree search engine.

12. The system of claim 7, wherein the algorithmic search is an AVL tree.

13. A system for operating a multilevel associative memory cache device, comprising:

a search client adapted to issue a search request for data to a first level associative memory cache element of the multi-level associative memory cache device and to at least one other level associative memory cache element of the multilevel associative memory cache device, the data having an associated priority;

a set of levels of the multilevel associative memory cache device, coupled to the search client, and configured to return the requested data; and an associative memory element, coupled to at least one level associative memory cache element of the multi-level associative memory cache device, for returning a first set of data, responsive to not finding the requested data in any level of the multi-level associative memory cache device, the first set of data including the requested data and data having an associated priority higher than the associated priority of the requested data.

14. The system of claim 13, further comprising a replacement logic, coupled to each level associative memory cache element, for replacing a second set of data in each level associative memory cache element with the first set of data, wherein the second set of data comprises:

previously cached requested data having an associated priority; and previously cached data having an associated priority higher than the associated priority of the previously cached requested data.

15. A method for operating an associative memory cache device, comprising:

issuing a search request for data to an associative memory cache element, the data having an associated priority; and responsive to not finding the requested data in the associative memory cache element, retrieving from an associative memory element a first set of data, the first set of data including the requested data and data having an associated priority higher than the associated priority of the requested data.

16. The method of claim 15, further comprising a step of replacing a second set of data in the associative memory cache element with the first set of data, wherein the second set of data comprises:

previously cached requested data having an associated priority; and previously cached data having an associated priority higher than the associated priority of the previously cached requested data.

17. The method of claim 16, wherein the replacement step further comprises:

assigning a first value to a count of frequency of access associated with the requested data, a second value to a count of frequency of access associated with data having an associated priority higher than the associated priority of the requested data, and a third value to a count of frequency of access associated with data having an associated priority lower than the associated priority of the requested data;

incrementing by a constant value the first value and the second value; and replacing the second set of data with the first set of data, the second set of data having a smallest value of a count of frequency of access.

18. The method of claim 16, wherein the step of replacing the second set of data in the associative memory cache element with the first set of data further comprises:

assigning a first value to a count of frequency of access associated with the requested data, a second value to a count of frequency of access associated with data having an associated priority higher than the associated priority of the requested data, and a third value to a count of frequency of access associated with data having an associated priority lower than the associated priority of the requested data;

decrementing by a constant value the third value; and replacing the second set of data with the first set of data, the second set of data having a smallest value associated with its count of frequency of access.

19. The method of claim 16, wherein the step of replacing the second set of data in the associative memory cache element with the first set of data further comprises:

assigning a first value to a position associated with the requested data, a second value to a position associated with data having priority higher than the associated priority of the requested data, and a third value to a position associated with data having an associated priority lower than the associated priority of the requested data;

incrementing by a constant value the second value;

assigning a fourth value to the position associated with the requested data; and replacing the second set of data with the first set of data, the second set of data having a lowest value associated with its position indicating that the second set of data has been least recently used.

20. A method for operating a multi-level associative memory cache device, the method comprising:

issuing a search request for data to a first level associative memory cache element of the multi-level associative memory cache device;

issuing a search request for data to at least one other level associative memory cache element of the multi-level associative memory cache device, responsive to not finding the requested data in the first level associative memory cache element; and retrieving a first set of data, responsive to not finding the requested data in any level of the multi-level associative memory cache device, the first set of data including the requested data and data having an associated priority higher than the associated priority of the requested data.

21. The method of claim 20, further comprising a step of replacing a second set of data in each level associative memory cache element of the multi-level associative memory cache device with the first set of data, wherein the second set of data comprises:

previously cached requested data having an associated priority; and previously cached data having an associated priority higher than the associated priority of the previously cached requested data.

22. The system of claim 19, wherein the fourth value is zero.

* * * * *